Patented July 28, 1931

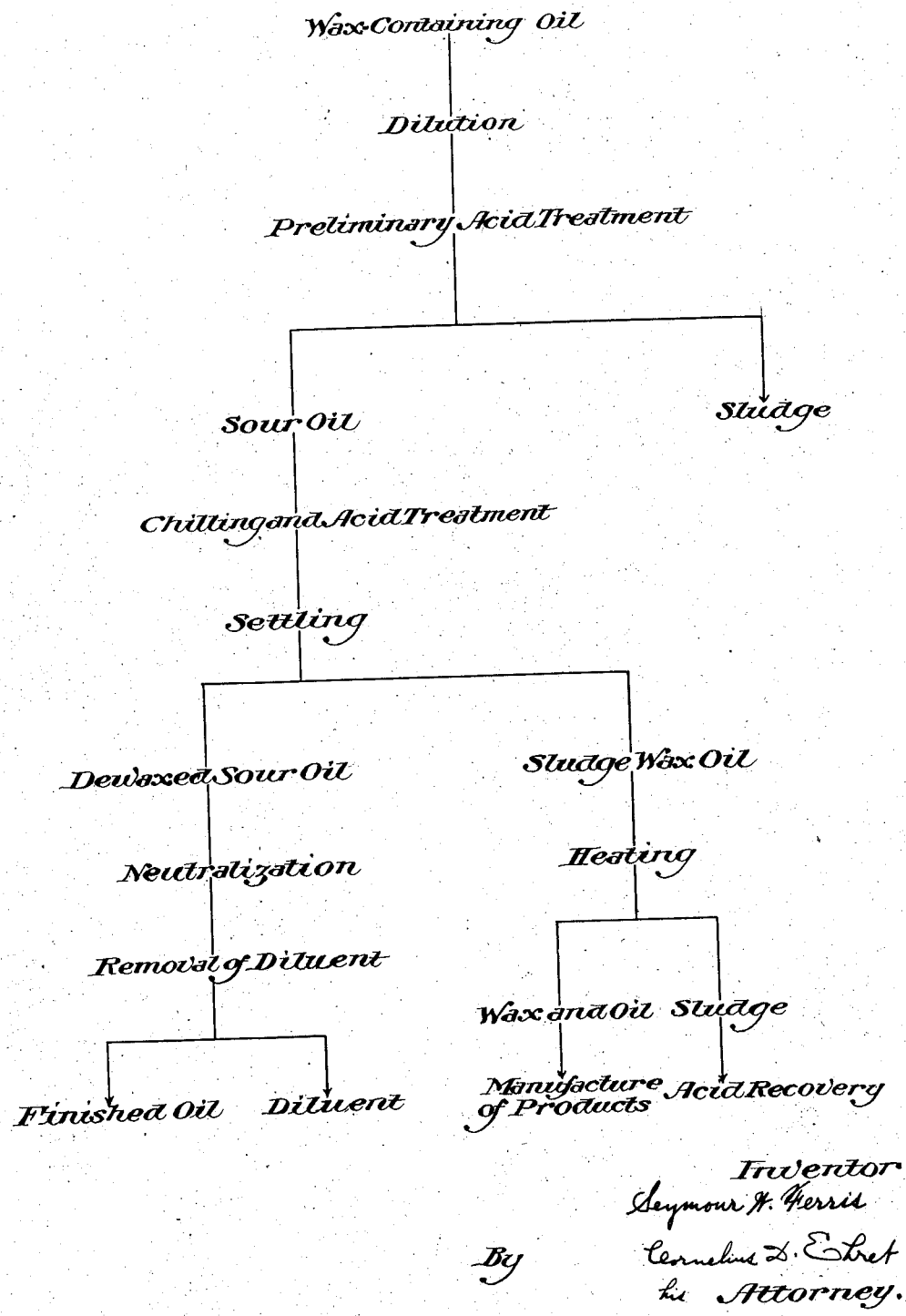

1,816,367

UNITED STATES PATENT OFFICE

SEYMOUR W. FERRIS, OF LANSDOWNE, PENNSYLVANIA

PROCESS OF DEWAXING OIL

Application filed March 9, 1928. Serial No. 260,322.

The present invention relates to an improved method of removing wax from crude petroleum, or any wax bearing portion thereof.

This invention has in view the separation of wax from that portion of the crude oil constituting the wax-containing distillates or cuts obtained by a primary distillation. It is also within the contemplation of this invention to effect a separation of the oils from the wax contained in the "bottoms" or that portion of the crude oil remaining in the still after primary distillation. However, it is to be borne in mind that the invention is also applicable to the removal of wax from a crude oil before separation into its components.

The wax content of certain petroleum oils, upon cooling, separates in the form of crystals, whereas, in other petroleum oils, the wax precipitates in the form of a more or less gel-like mass. Heretofore, it has been customary to remove crystalline wax from an oil by cold filtration. For the removal of wax separating as a gel-like substance, methods of a different sort were resorted to. One of such methods comprised diluting the oil with an oil of low viscosity, thereafter cooling the diluted mixture and allowing the gelatinous precipitate to settle by gravity, or, instead of settling, subjecting the cooled diluted mixture to a process of centrifugation. Another method heretofore known for effecting such a separation consists in redistilling the oil, without dilution, under conditions effecting cracking sufficiently to change the nature or structure of the wax to permit its removal by filtration at low temperatures.

There are decided disadvantages in each of the above methods. The filtration process is undesirable in that it is not adapted to the removal of wax from all of the cuts or fractions of a particular crude petroleum, in fact it is only suitable for the removal of wax from but a limited portion of the crude oil. The separation by cold settling requires a prolonged period of time, usually five or six days, before the wax separates sufficiently, and in addition, a poor yield of wax-free oil is obtained. The operation including centrifuging requires, of necessity, many installations of small apparatus for large scale operation, and therefore the expense of equipment, as well as the maintenance of many small units, is objectionable. The redistillation method also is costly and the cracking incident to the method destroys to a rather marked degree the valuable properties of the oil which adapt it for use as a lubricant.

In accordance with this invention the oil to be treated is subjected to a cooling process, and while cold acid is mixed with the oil, to effect separation of wax from the oil.

I have found that by first chilling a wax bearing oil, to cause at least a portion of the wax to separate as solid particles in the so-called crystalline or so-called amorphous form, or both, and, while the mixture is at a relatively low temperature, by adding an acid thereto and thoroughly inter-mixing the acid with the oil and wax mixture, a simultaneous settling of the wax and the resulting acid sludge from the oil may be effected. Furthermore, it has been found that such procedure affords a very efficient method of removal of wax from a wax-containing oil.

For an understanding of my invention reference is had to the accompanying drawing which is a flow chart of a process typical of and comprehending my invention. In carrying out my process, the wax containing oil is usually diluted with a suitable diluent of low viscosity. The primary reason for dilution is to put the oil in condition to be readily handled at low temperatures. The extent of dilution, of course, will depend upon the particular oil to be treated, the heavy oils, in general, requiring a greater amount of diluent than those having lower viscosities. After dilution the oil may be subjected to a preliminary treatment with sulphuric acid at ordinary temperature. The acid added is thoroughly intermixed with the oil and as a result a heavy sludge precipitates out. This sludge contains a rather large percentage of the heavy tarry matter contained in the oil, and upon allowing the mixture to stand, the sludge settles to the bottom, whereupon the oil is separated from the sediment. It shall be understood the preliminary acid treatment is incidental and whether resorted to in any particular case depends upon the nature of the oil to be treated.

After the preliminary acid treatment at normal temperatures, the unneutralized oil is chilled to a temperature at which at least a portion of the wax content of the oil changes from the liquid to the solid form, the extent of reduction in temperature depending upon the nature of the particular oil under treatment and the extent to which it is desired to remove its wax content. Ordinarily the temperature of the wax-containing oil is reduced, at any suitable rate, either rapidly or slowly, to below 20° F. Upon effecting a substantially uniform reduced temperature throughout, the mixture is further treated with acid, the degree of concentration of this acid, as well as the acid used in the aforesaid preliminary treatment, varying with particular operating conditions.

During the addition of acid to the chilled oil, the mixture is vigorously agitated. This acid treatment causes generation of heat and a consequent slight rise in temperature of the mixture, and this rise in temperature is taken into account in the determination of the temperature to which the oil is reduced in the cooling operation.

The mixture after addition of the acid and upon the completion of the agitation, is allowed to stand for settling and during this period no substantial increase or decrease of temperature is allowed, as by holding the mixture in a heat insulated container. As the sludge resulting from the last acid treatment settles, it carries down with it the solid particles of wax which have separated. At the low temperatures at which this acid treatment is carried out, the oxidizing effect or reaction of the acid upon the ingredients of the oil is materially less extensive than if the acid treatment were effected at higher or normal temperatures.

The mixture is allowed to stand until the wax and sludge have substantially completely settled out from the upper layer of oil. Generally this is effected in from about one to about ten hours, depending largely upon the particular type of oil being treated and the degree of wax removal desired; the time is short when contrasted with the matter of days required in the prior methods of cold settling.

It is to be understood that the separation of the wax and acid sludge from the cooled oil may be accomplished, in lieu of the above described settling process, by any of the ordinary methods heretofore known, as by centrifuging or, possibly, by filtration. However I have found that the preferred method of separation is by settling.

After the settling is complete, or substantially so, the upper oil layer is withdrawn and the acid content thereof neutralized in any suitable manner. At this stage in the operation, the aforesaid diluent, if present, may be removed by any suitable or desirable method, as, for example, by distillation. Upon completion of removal of the diluent there remains, as the desired or finished product, an oil which is substantially free of wax or whose wax content has been greatly reduced.

The waxy sludge from which the upper oil layer has been removed, and which contains a small portion of the oil, is heated to a temperature sufficiently high, for example about 170° F., to melt the wax content thereof and to cause it to separate and while the mixture is maintained at this temperature the heavier portion is allowed to settle into separate layers. The upper layer comprises an intermediate product which contains wax and a small amount of oil and is utilized in the manufacture of marketable products. The remainder comprises the sludge and recoverable acid.

A specific example of a particular oil treated by a process within the scope of this invention is as follows: A wax bearing oil having a Saybolt viscosity of 151 seconds at 210° F. and a pour of 100° F. is diluted with naphtha having a boiling range of from 175° F. to 350° F. The diluted oil is treated at a temperature of 84° F. with 92.8% sulphuric acid in the proportion of one-half pound of acid per gallon of oil. After removal from the sludge, the oil is chilled uniformly throughout to −4° F., and 92.8% sulphuric acid, in the proportion of one pound of acid to one gallon of the oil, is gradually added and the mixture vigorously agitated. Allowing the mixture to stand, it is found that substantially complete settling of the wax and sludge from the oil takes place within a period of about 3 hours. The oil is drawn off from the waxy sludge, and its acid content neutralized by mixing it with 5% of fine clay, such as fuller's earth, which is subsequently removed, as by filtration. The naptha diluent is then distilled off and the resultant oil constitutes the finished product having a Saybolt viscosity of 117 seconds at 210° F., a pour of 30° F. and of such improved color as to require no further acid treatment.

As will be obvious to those skilled in the art, various departures from the procedure heretofore described are within the scope of this invention. For instance in the treatment of particular oils a diluent may not be required in order to make the oil to be treated sufficiently fluid to be readily workable throughout the entire process. Likewise in some oils there may not be present heavy tarry material in amount sufficient to warrant the preliminary acid treatment before chilling.

For the second or principal acid treatment aforesaid may be substituted the application to the chilled oil of some other reagent, such as nitric acid or stannic chloride, which will effect a precipitate which will entrain or carry with it the solid or semisolid wax which has crystallized from the oil because of its low temperature.

It will be noted that several distinct advantages reside in this process over the processes heretofore known for the treatment of oil for removal of wax. Among these are the comparatively short period of time required for carrying out the complete process of wax removal, and in particular for the step of cold settling of the waxy sludge; and the very high yield of substantially wax free oil.

What I claim is:

1. A process for removing wax from a wax-containing petroleum oil which comprises treating the oil with a sludge-forming acid at normal temperature, removing the oil from the sludge formed, chilling the oil so removed to a temperature at which at least a portion of the wax content thereof will form solid particles, and, while cold, treating the oil with a sludge-forming acid, and separating the wax and resulting acid sludge from the oil.

2. A process for removing wax from a wax-containing petroleum oil which comprises diluting the oil, treating the diluted oil with sludge-forming acid at normal temperature, removing the oil from the sludge formed, chilling the oil so removed to a temperature at which at least a portion of the wax content thereof will form solid particles, while cold, treating the oil with a sludge-forming acid and separating the wax and resulting acid sludge from the oil, and removing the diluent from the separated oil.

3. A process for removing wax from a wax-containing petroleum oil which comprises reducing the viscosity of the oil with a diluent, treating the diluted oil with a sludge-forming acid at normal temperature, removing the oil from the sludge formed, cooling the oil so removed to a temperature at which at least a portion of the wax content thereof will form solid particles, while cold, treating the oil with a sludge-forming acid and allowing the mixture to settle, separating the dewaxed oil from the sludge component, neutralizing the oil so separated, and separating the diluent from the dewaxed oil.

4. A process for removing wax from wax-containing petroleum oil which comprises treating the oil with a sludge forming acid at normal temperature, removing the oil from the acid sludge formed, chilling the oil to a temperature below +20 deg. F., treating the oil with a sludge forming acid while chilled, separating the wax and the resulting acid sludge from the oil while at substantially the temperature of the mixture resulting from such treatment, and neutralizing the oil so separated.

SEYMOUR W. FERRIS.